United States Patent [19]

Jutand et al.

[11] Patent Number: 4,853,887
[45] Date of Patent: Aug. 1, 1989

[54] BINARY ADDER HAVING A FIXED OPERAND AND PARALLEL-SERIAL BINARY MULTIPLIER INCORPORATING SUCH AN ADDER

[76] Inventors: Francis Jutand, 167 Rue Etienne Dolet, 94230 Cachan; Nicolas Demassieux, 4 Impasse Reille, 75014 Paris; Michel Dana, 53 rue de la Colonie, 75013 Paris, all of France

[21] Appl. No.: 95,214

[22] Filed: Sep. 11, 1987

[30] Foreign Application Priority Data

Sep. 22, 1986 [FR] France .................. 86 13222

[51] Int. Cl.$^4$ .................. G06F 7/50; G06F 7/52
[52] U.S. Cl. .................. 364/784; 364/757; 364/770
[58] Field of Search .............. 364/754, 757, 759, 760, 364/768, 770, 784–788

[56] References Cited

U.S. PATENT DOCUMENTS

| | | | | |
|---|---|---|---|---|
| 4,153,939 | 5/1979 | Kudou | .................. | 364/770 |
| 4,417,315 | 11/1983 | Russell | .................. | 364/770 |
| 4,417,316 | 11/1983 | Best | .................. | 364/770 |
| 4,584,660 | 4/1986 | Young et al. | .................. | 364/770 |
| 4,623,982 | 11/1986 | Ware | .................. | 364/770 |
| 4,700,325 | 10/1987 | Ware | .................. | 364/770 |

FOREIGN PATENT DOCUMENTS 861515 of 0000 United Kingdom .

OTHER PUBLICATIONS

IBM Technical Disclosure Bulletin, vol. 27, No. 11, Apr. 1985, pp. 6450–6453, New York, U.S. "Parallel-Array Incrementing Newtork".

IEEE Journal of Solid-State Circuits, vol. SC-20, No. 2, Apr. 1985, pp. 542–547, IEEE, New York, U.S.; D. A. Henlin et al.: "A 16 Bit×16 Bit Pipelined Multiplier Macrocell", FIGS. 2–5.

*Primary Examiner*—Gary V. Harkcom
*Assistant Examiner*—Dale M. Shaw
*Attorney, Agent, or Firm*—Oblon, Spivak, McClelland, Maier & Neustadt

[57] ABSTRACT

Binary adder having a fixed operand and a parallel-serial binary multiplier incorporating such an adder. The multiplier comprises a dedicated adder, whose elements (transistors, logic gates, etc.) are wired to incorporate the value of the fixed operand B. The non-fixed operand D is applied in serial form to the control input of a multiplexer. The multiplier also comprises an accumulator-shift register for storing a partial result A of the multiplication. As a function of the state of the multiplexer, the register receives A or A+B.

7 Claims, 5 Drawing Sheets

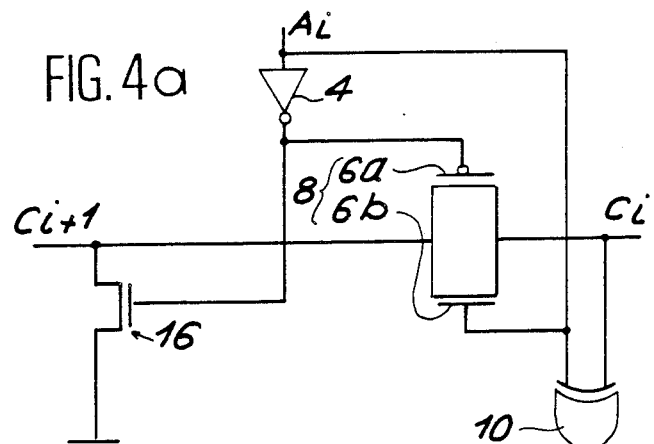
FIG. 4a
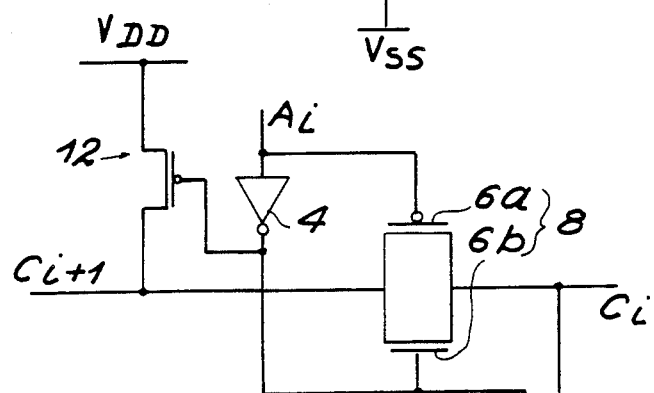
FIG. 4b
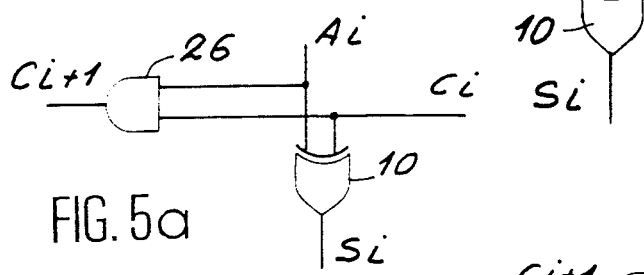
FIG. 5a
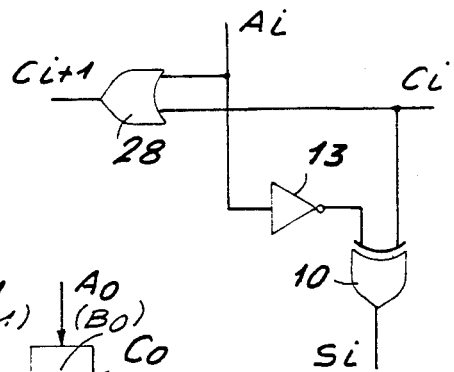
FIG. 5b
FIG. 6
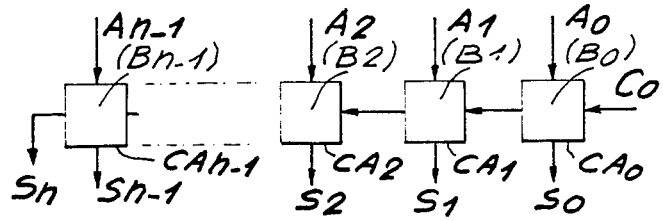

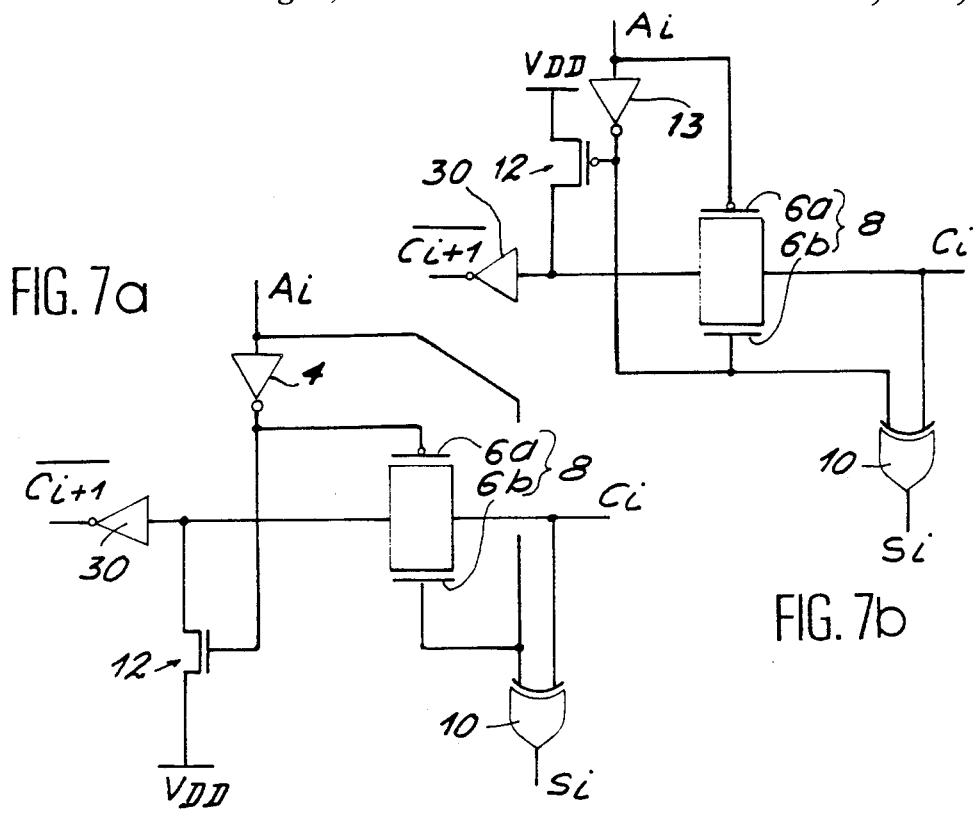
FIG. 7a
FIG. 7b
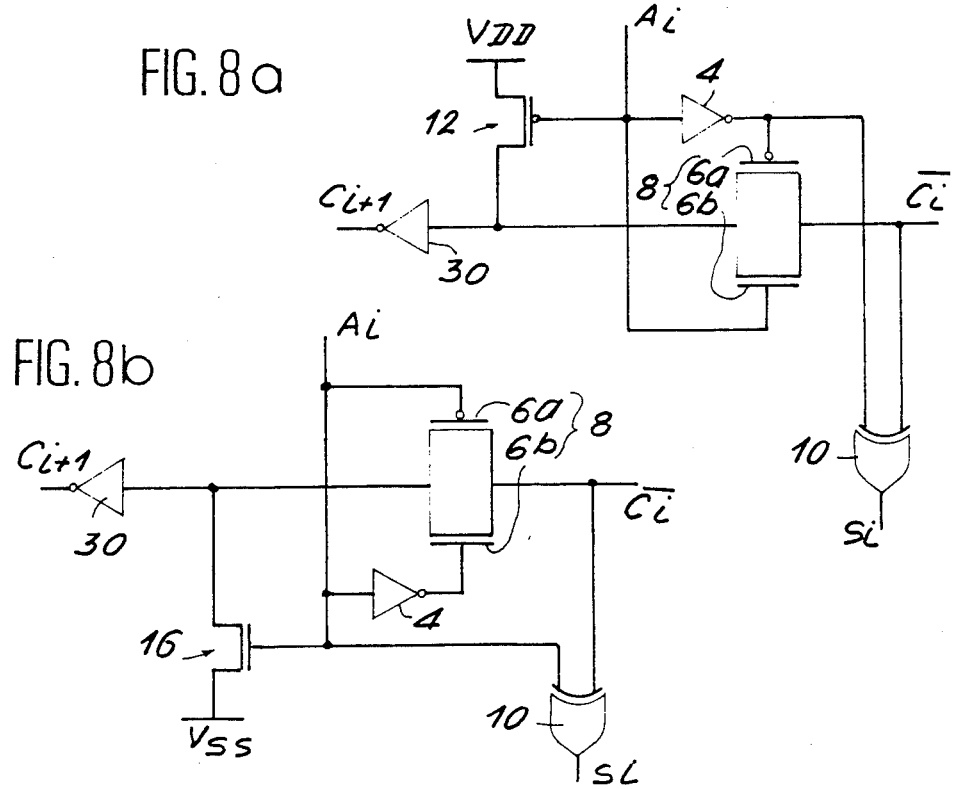
FIG. 8a
FIG. 8b

BINARY ADDER HAVING A FIXED OPERAND AND PARALLEL-SERIAL BINARY MULTIPLIER INCORPORATING SUCH AN ADDER

BACKGROUND OF THE INVENTION

The present invention relates to a binary adder for calculating the sum of two operands, among which one of the operands has a fixed, known value.

The invention also relates to a parallel-serial binary multiplier for calculating the product between a serial operand having a random binary value and a parallel operand having a fixed, known binary value.

Adders and multipliers are operators used in most information processing systems from microprocessors up to complete computers. Multipliers are often the critical operators of an information processing system, both from the standpoint of their speed and from the standpoint of the material cost involved in the realization thereof.

The situation arises that one of the operands is not only fixed, but also known at the time of realizing the operator. This is particularly frequent in the field of specialized integrated circuits specifically designed for effecting a particular algorithm. Particular reference is made to signal processing algorithms. For example, in the field of image signal transmission, the image signal undergoes a compression and coding treatment prior to its transmission.

This particularly includes a linear transformation, such as a discrete cosine transform. Such a transformation is conventionally represented by a graph, in which the branches represent a multiplication operation and the nodes an addition or subtraction operation.

Such graphs are described in "A fast computational algorithm for the discrete cosine transform" by W.H. CHEN et al, IEEE Transactions on Communications, vol. COM-25, No. 9, September 1977, pp 1004 to 1009, "A high FDCT processor for real-time processing of NTSC colot TV signal" by A. JALALI et al, IEEE Transactions on Electromagnetic Compatibility, vol. EMC-24, No. 2, May 1982, pp 278 to 286 and U.S. Pat. No. 4,385,363.

In such a linear transformation, each multiplication operation relates to a known operand, whose binary value is of a random nature, and a fixed operand, whose binary value is known.

In the prior art circuits, the fact that one of the operands is fixed and known is not taken into account. Although one of the two operands to be added or multiplied is fixed, use is generally made of a complete multiplier or adder making it possible to deal with two operands having a random value. This is not satisfactory. Thus, advantages could be obtained if account was taken of the fact that one of the two operands is fixed. These advantages consist of a higher operator calculating speed or a reduction in the surface occupied by the operator on an integrated circuit.

It could clearly be envisaged to force one of the inputs of the operator to the value of the fixed operand by linking the different bits with adequate potentials. However, there would only be small speed and surface gains.

A known solution taking account of the fact that one of the two operands is fixed is storage in a read only memory of the precalculated results of the operation between said fixed operand and all the possible values of the variable operand. The operation then amounts to reading into a read only memory, the variable operand serving as an index for addressing said memory.

This method can have a certain interest for some applications. However, these applications are limited, because the size of the read only memory and the access time thereto increase very rapidly with the size of the operands. The very significant size of the ROM in particular makes it impossible to use such a method for producing adders or multipliers in the form of integrated circuits, because the surface cost is excessive.

The prior art addition or multiplication operators are consequently not very fast and are expensive as regards surface in the case of an integrated construction, no matter whether they are in the form of a standard multiplier being able to multiply two variable operands or in the form of a table contained in a ROM.

SUMMARY OF THE INVENTION

The object of the invention is to reduce the surface costs of addition and multiplication operators in the case where one of the two operands is fixed and known.

The invention aims at a binary adder for adding a first operand with a random binary value to a second operand with a fixed and known binary value, whereof the structure and connections are defined in accordance with said predetermined binary value of the second operand.

Specifically, the present invention relates to a binary adder for adding a first operand A of n bits $A_{n-1}, \ldots A_0$ having a random binary value to a second operand B of n bits $B_{n-1}, \ldots B_0$ of predetermined binary value, said adder having n addition cells $CA_{n-1}, \ldots CA_0$, each cell being provided with a data input for receiving a bit $A_i$, $0 \leq i \leq n-1$ from the first operand, a carry input for receiving a carry bit $C_i$, a data output $S_i$ and a carry output for supplying a carry bit $C_{i+1}$, the carry output of the addition cell of rank j, $0 \leq j \leq n-2$ being connected to the carry input of the addition cell of rank j+1, wherein each addition cell $CA_i$, $0 \leq i \leq n-1$ is wired as a function of the value of bit $B_i$ of the operand B.

According to a preferred embodiment, the binary adder according to the invention comprises two types of addition cells, which are on the one hand addition cells designed for receiving an uncomplemented carry bit and for supplying a complemented carry bit, and addition cells designed for receiving a complemented carry bit and for supplying an uncomplemented carry bit, the consecutive addition cells of the adder being alternately of the first and second types.

The invention also relates to a parallel-serial binary multiplier for the multiplication of two binary operands, whereon one has a fixed, known value.

This binary multiplier comprises an adder according to the invention, wired in accordance with the value of the fixed operand, said adder having an input and an output; a multiplexer having two inputs and one output, the first input being connected to the output of the adder, said multiplexer also having a control input to which is applied the unfixed operand in serial form; and an accumulator-shift register having an input and an output, the input of said register being connected to the output of the multiplexer and the output of said register being connected to the input of the adder and to the second input of the multiplexer.

According to a constructional variant, for permitting the multiplication of two operands of opposite sign, the multiplier comprises a second multiplexer positioned between the output of the accumulator-shift register and the input of the adder, said second multiplexer having two inputs, respectively connected to the output of the accumulator-shift register and to the output of an inverter, whose input is connected to the output of the accumulator-shift register, and a third multiplexer for controlling the state of the carry bit applied to the adder, the second and third multiplexers being controlled by the most signficant bit $D_{n-1}$ of the unfixed operand D.

According to an advantageous embodiment, the multiplier able to process two operands of opposite sign also comprises a Booth decoder for simultaneously processing several bits of the serial operand said decoder incorporating a means for storing a status bit for storing the polarity of the content of the accumulator-shift register.

BRIEF DESCRIPTION OF THE DRAWINGS

The invention is described in greater detail hereinafter relative to non-limitative embodiments and the attached drawings, wherein show:

FIGS. 4a and 4b Addition cells for an adder according to the invention for adding a bit $A_i$ of random binary value respectively to a bit of logic value "0" and to a bit of logic value "1".

FIGS. 5a and 5b Diagrammatically the addition cells of FIG. 4a and 4b in the form of logic gates.

FIG. 6 Diagrammatically an adder according to the invention, in which the addition cells are wired as a function of the value of the bits of the fixed operand.

FIGS. 7a and 7b Diagrammatically the addition cells according to the invention respectively corresponding to a fixed bit of logic value "0" and a fixed bit of logic value "1", said addition cells being designed to receive an uncomplemented carry bit and for supplying a complemented carry bit.

FIGS. 8a and 8b Diagrammatically addition cells according to the invention respectively corresponding to a fixed bit of logic value "0" and a fixed bit of logic value "1", said addition cells being designed to receive a complemented carry bit and for supplying an uncomplemented carry bit.

DETAILED DESCRIPTION OF THE PREFERRED EMBODIMENTS

Before describing the preferred embodiments of the adder and the multiplier according to the invention, reference will be made to the general structure of standard prior art adders and multipliers. These operators are able to process two operands having a random binary value. As an example of a prior art adder, a description will be given of a CMOS technology adder of the Manchester Carry Chain type.

Figure 1:
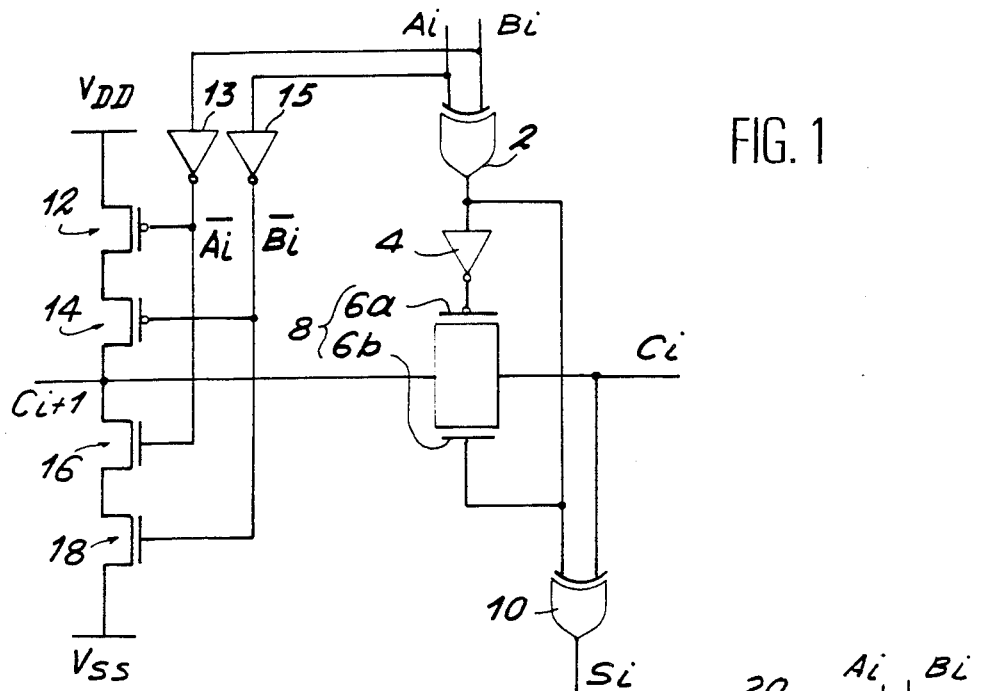
FIG. 1 An addition cell according to the prior art for adding two bits $A_i$ and $B_i$ of random value.

FIG. 1 shows a prior art addition cell making it possible to calculate the sum of two bits $A_i$ and $B_i$ of random value. The complete adder comprises a group of such addition cells, each receiving one bit from each of the two operands A and B. Apart from the two data inputs for receiving bits $A_i$ and $B_i$, said addition cell comprises a carry input for receiving the carry bit $C_i$ of the preceding addition cell of the adder. The sum $S_i$ of the two bits $A_i$ and $B_i$ is supplied to one output and the carry $C_{i+1}$ to another output.

The addition cell shown in FIG. 1 comprises a XOR gate 2 receiving on each of its inputs the bits $A_i$ and $B_i$, an inverter 4, whose input is connected to the output of the XOR gate 2, a switch 8 conventionally comprising a CMOS transistor with a P channel 6a and a CMOS transistor with a n channel 6b and a XOR gate 10, whereof one input is connected to the output of the XOR gate 2 and whereof the other input receives the carry bit $C_i$.

Switch 8 is placed on a line connecting the carry input $C_i$ to the carry output $C_{i+1}$. This switch is controlled by the sign of the output signal of the XOR gate 2.

This addition cell also comprises two channel P CMOS transistors 12, 14 arranged in series between the carry output $C_{i+1}$ and a fixed potential $V_{dd}$ corresponding to the logic state "0". It comprises, symmetrically, two n channel CMOS transistors 16, 18 connected in series and located between the carry output $C_{i+1}$ and a fixed potential $V_{ss}$ corresponding to logic state "1". Transistors 12 and 16 are controlled by the complement $\overline{A_i}$ of bit $A_i$, produced by an inverter 13 and transistors 14 and 18 by the complement $\overline{B_i}$ of bit $B_i$ produced by an inverter 15.

Figure 2:
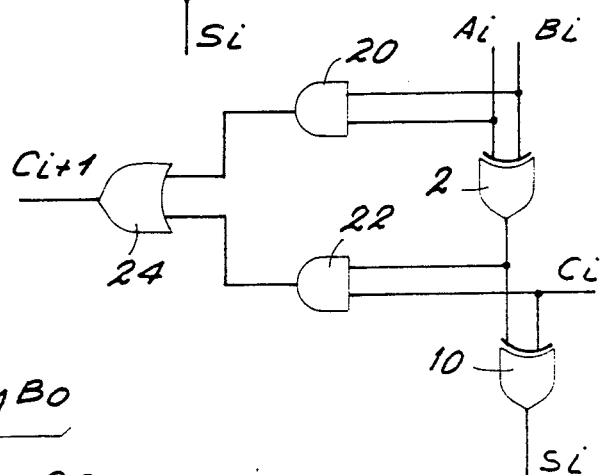
FIG. 2 A diagrammatic representation of the addition cell of FIG. 1 in the form of logic gates.

FIG. 2 shows the addition cell of FIG. 1 in the form of a group of logic gates. The AND gates 20, 22 and the OR gate 24 represent the same function as the assembly constituted by inverters 4, 13 and 15, switch 8 and transistors 12, 14, 16 and 18.

In FIG. 2, the AND gate 20 comprises two inputs receiving the bits $A_i$ and $B_i$, gate 22 comprises two inputs receiving the signal supplied by the XOR gate 2 and bit $C_i$ and the OR gate 24 comprises two inputs connected to the outputs of the AND gates 20, 22, said OR gate 24 supplying the carry bit $C_{i+1}$.

A conventional adder is constituted by the placing in series of a plurality of addition cells, as shown in FIGS. 1 and 2, the carry output of each cell being connected to the carry input of a following cell.

Figure 3:
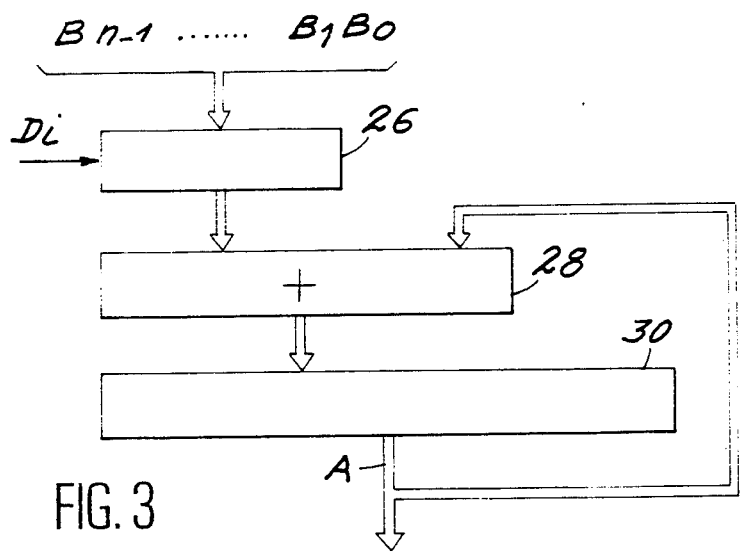
FIG. 3 The structure of a binary adder according to the prior art for multiplying two operands with a random binary value.

A parallel-serial binary multiplier according to the prior art for multiplying two binary operands B and D of random value and incorporating such an adder is shown in FIG. 3.

Adder 28 comprises two inputs and supplies on its output the sum of the operands applied to its inputs. The output of said adder is connected to the input of an accumulator-shift register 30, which stores the intermediate result of the multiplication and the shift of one bit to the right of said result for each iteration. The output of the accumulator-shift register is relooped to one of the inputs of adder 28.

Finally, the multiplier comprises a selection means 26, which receives an operand B on a parallel input and the other operand D on a serial input and which supplies the parallel operand to an input of the addition means when the logic value of the bit applied to the serial input is "1", and "0" in the opposite case.

With reference to FIGS. 1 to 3, the conventional structures of standard adders and multipliers have been described. A description will now be given of embodiments of an adder and a multiplier according to the invention.

According to the invention, each addition cell of an adder for adding a fixed operand of known value and an operand of random value has a particular structure, which is a function of the specific value of the fixed operand. Thus, in an adder according to the invention, there are two addition cell types: the addition cells associated with a bit of the fixed operand of logic value "0" and the addition cells associated with a bit of the fixed operand of logic value "1".

FIGS. 4a and 4b show addition cells which, for example, are in CMOS technology, corresponding to these two addition cell types. These cells can be deduced from the known addition cell shown in FIG. 1 by eliminating certain elements.

Thus, the addition cell of FIG. 4a is based on the addition cell of FIG. 1 and involves the elimination of the XOR gate 2, the inverter 15 and transistors 12, 14 and 18.

Moreover, the input of the inverter 4 directly receives bit $A_i$, which makes it possible to eliminate inverter 13. This adder makes it possible to carry out the addition between a bit $A_i$ of random value and a bit $B_i$ of fixed value equal to "0".

The addition cell shown in FIG. 4b is an addition cell according to the invention for adding a bit $A_i$ of random binary value to a bit $B_i$ of fixed value equal to "1". This additon cell is deduced from that of FIG. 1 by eliminating the XOR gate 2 and transistors 14, 16 and 18.

The addition cells of FIGS. 4a and 4b are shown in the form of logic gates, respectively in FIGS. 5a and 5b. The addition cell shown in FIG. 4a has thus been reduced to two logic gates, namely a XOR gate 10 and an AND gate 26. One input of each gate receives bit $A_i$, whilst the other input receives the carry bit $C_i$. The AND gate 26 supplies the carry bit $C_{i+1}$ and the XOR gate 10 the sum bit $S_i$.

The addition cell shown in FIG. 5b comprises an inverter 13, a XOR gate 10 and an OR gate 28. NOT switch 13 receives bit $A_i$. Its output is connected to one input of the XOR gate 10, whose other input receives the carry bit $C_i$. The output of the XOR gate 10 supplies the sum $S_i$. Finally, the OR gate 29 receives on its inputs bits $A_i$ and $C_i$ and supplies the carry bit $C_{i+1}$.

The complete adder comprises addition cells, as shown in FIGS. 4a and 4b. These addition cells are connected in series, i.e. the carry output of one addition cell is connected to the carry input of the following addition cell.

FIG. 6 diagrammatically shows an adder according to the invention comprising a group of additon cells $CA_0$, $CA_1$......$CA_{n-1}$ connected in series. Each addition cell receives a bit $A_i$, in which $0 \leq i \leq n-1$ from the variable operand $A_{n-1}$, $A_{n-2}$.....$A_0$.

According to the invention, each addition cell $CA_i$ has a specific structure, which is a function of the logic value of bit $B_i$ of the fixed, known operand $B_{n-1}$, $B_{n-2}$.....$B_0$.

Thus, the adder comprises two types of addition cell, which can e.g. be the addition cells shown in FIGS. 4a and 4b.

The adder can be used no matter what the sign of the two operands. In the case where the fixed operand is negative, it is merely necessary to choose the addition cells in such a way that said fixed operand is represented in 2's complement code.

The adder can also be used as a subtracter. In this case it is merely necessary to interchange the addition cells of the first and second type which, as in the preceding case, amounts to adding the complement of the fixed operand and to wire the carry bit $C_0$ to the logic value "1", which amounts to adding the fixed operand -B to the variable operand A.

The use of addition cells wired according to the value of the bit of the fixed operand leads to a significant surface gain. Thus, the addition cells shown in FIGS. 4a and 4b only require nine transistors, whereas the prior art addition cell of FIG. 1 requires 22 transistors, which represents a silicon surface gain of more than 50%.

Moreover, as the critical path in the adder according to the invention is less charged than in an adder only having addition cells according to FIG. 1, the performance characteristics of the adder according to the invention are better. They can be improved in known manner by alternately using an addition cell designed for receiving an uncomplemented carry bit and for supplying a complemented carry bit, and an addition cell for receiving a complemented carry bit and for supplying an uncomplemented carry bit.

Such a structure makes it possible to speed up the propagation of the carry bit in the successive addition cells of the adder. To permit the realization thereof within the scope of the invention, it is necessary to replace each of the two addition cell types, as shown in FIGS. 4a and 4b by two addition cell subtypes, one corresponding to the case where the received carry bit is uncomplemented and the other to the case where the carry bit received is complemented.

FIGS. 7a and 7b show addition cells corresponding respectively to a bit $B_i$ of logic value "0" and a bit $B_i$ of logic value "1", receiving the carry bit $C_i$ and supplying the complemented carry over bit $\overline{C_{i+1}}$.

In the embodiment shown in FIGS. 7a and 7b, the addition cells are identical to the addition cells respectively shown in FIGS. 4a and 4b supplemented by an inverter 30 for complementing the value of the output carry bit.

In the same way, the addition cells shown in FIGS. 8a and 8b respectively correspond to bit $B_i$ of logic value "0" and to bit $B_i$ of logic value "1" receiving the complemented carry bit $\overline{C_i}$ and supplying the carry bit $C_{i+1}$.

The addition cell shown in FIG. 8a is substantially identical to the addition cell shown in FIG. 7b. It only differs therefrom by the fact that the bit $A_i$ received by transistor 6a is complemented by means of the inverter 4, whereas transistors 6b and 12 directly receive bit $A_i$. In the same way, the addition cell shown in FIG. 8b is substantially identical to that shown in FIG. 7a, with the difference here that bit $A_i$ is applied directly to transistors 6a and 16, whereas transistor 6b receives the bit $A_i$ complemented by the inverter.

With reference to FIGS. 4a, 4b, 7a, 7b, 8a and 8b special embodiments of addition cells for an adder according to the invention have been described. As an example, a description has been given of addition cells in CMOS technology. However, it is obvious that the invention can be realized on the basis of a different addition cell architecture using different technology.

The adder described hereinbefore constitutes a first object of the invention. This adder can be advantageously used for producing a binary multiplier for multiplying an operand of random value by an operand of fixed, known value, which constitutes the second object of the invention.

Figure 9:
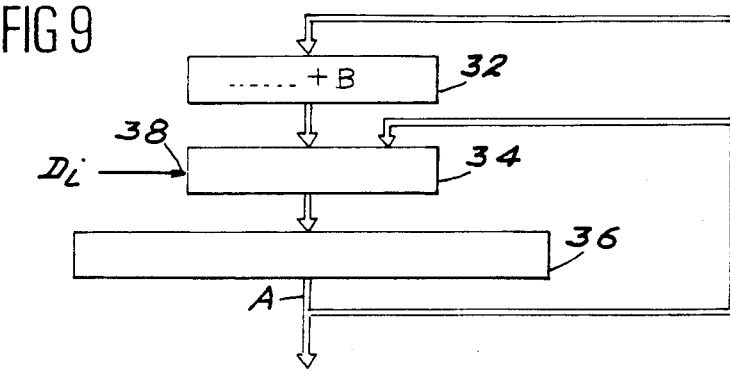
FIG. 9 Diagrammatically the structure of a multiplier according to the invention, said multiplier incorporating an adder according to FIG. 6.

A binary multiplier according to the invention is diagrammatically shown in FIG. 9 and comprises an adder 32 according to the invention, a multiplexer 34 and an accumulator-shift register 36.

The inputs and outputs of the elements constituting the multiplier are of the parallel type. Register 36 comprises an input and an output. Adder 32 comprises an input connected to the output of register 36 and an output. Multiplexer 34 comprises two inputs, one connected to the output of adder 32 and the other to the output of register 36. The output of multiplexer 34 is connected to the input of register 36.

The fixed, known operand B is materialized in the structure of adder 32, as described with reference to FIG. 6. The non-fixed operand D is applied in serial form to a control input 38 of multiplexer 34. The latter functions as follows. If bit $D_i$ of rank i, in which $0 \leq i \leq n-1$ of operand D applied to input 38 of multiplexer 34 has the value "0", multiplexer 34 is controlled so as to connect the output of register 36 to the input of said register 36. Conversely, if bit $D_i$ has the value "1", the input of register 36 is connected to the output of adder 32.

The multiplier of the invention shown in FIG. 9 has a slightly different structure from that of the prior art multiplier shown in FIG. 3. The main difference is that the adder 28 (FIG. 3) is a standard adder able to add two random operands, whereas adder 32 in FIG. 9 is a dedicated adder only able to add a predetermined operand B to a random operand.

The advantages of the multiplier according to the invention compared with the prior art multipliers result from the use of adder 32. These advantages are a smaller surface on an integrated circuit and a higher processing speed due to the optimization of the adder.

In the embodiment shown in FIG. 9, the adder can only add the content of register 36 to fixed operand B, which can be positive or negative. In the second case, as stated in connection with the description of FIG. 6, operand B is 2's complement coded and the first addition cell of the adder receives on its carry bit $C_0$ a bit of logic value "1".

The processing of the sign of the serial operand is more difficult. Thus, in 2's complement code, the most significant bit of the serial operand A represents a negative significance and it is necessary to add to the content of register 36 the opposite of the fixed operand B in order to obtain the correct result. This cannot be realized with the adder 32 of the multiplier of FIG. 9 which, by its very design, can only add the single operand B.

To obviate this problem, the multiplier of FIG. 9 is modified so as to be able to add the opposite of the fixed operand B. Such a modified multiplier is shown in FIG. 10.

In this multiplier, the elements which are identical to those of the multiplier of FIG. 9 carry the same references. The multiplier of FIG. 10 comprises supplementary elements to make it possible to invert the content of register 36. These means comprise an inverter 38, whereof the input is connected to the output of register 36 and a multiplexer 40, whereof a first input is connected to the output of inverter 38 and whereof the other input is connected to the output of register 36. The output of multiplexer 40 is connected to the input of adder 32.

Multiplexer 40 comprises a control input 42 for receiving the most significant bit $D_{n-1}$ of serial operand D. Thus, multiplexer 40 supplies to the input of adder 32 the content of register 36, if $D_{n-1}$ is equal to "0", or the opposite of the content of register 36, if $D_{n-1}$ is equal to "1".

Figure 10:
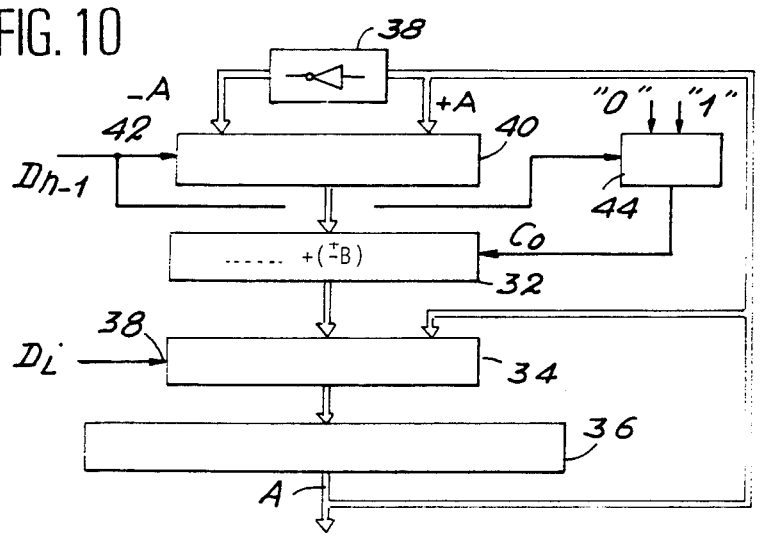
FIG. 10 A constructional variant of the multiplier according to the invention for processing two operands of random signs.

The multiplier shown in FIG. 10 also comprises another multiplexer 44 also controlled by the most significant bit $D_{n-1}$ of the serial operand D. This multiplexer 44 has two inputs to which are respectively applied the logic signals of value "0" and "1". The output of this multiplexer is connected to the carry input $C_0$ of adder 32.

As stated hereinbefore, the addition between the fixed operand B and a negative serial operand D ($D_{n-1}$ of logic value "1") makes it necessary to be able to subtract the fixed operand B from the content of register 36. This is not directly possible with adder 32 which, by design, can only add the fixed operand B to the variable operand received.

This operation is replaced in multiplier 10 by the following sequence: addition of the opposite of the content of register 36 to the fixed operand B, the result being stored in memory 36, complementation of the content of register 36 by means of inverter 38, the final result of the multiplication being delivered on the output of multiplexer 40.

FIG. 10 illustrates an embodiment of a multiplier making it possible to add the fixed operand B to a non-fixed operand D, no matter what the sign of the latter. In general terms, the invention covers all architectures making it possible to complement at least one of the two operands, so as to amount to an addition producing the opposite of the sought result and following by a complementation operation of said result.

As a function of the use which it is intended to make of the result of the multiplication, it is possible to make do with the accumulator-shift register 36, or to add a supplementary parallel-series register.

Figure 11:
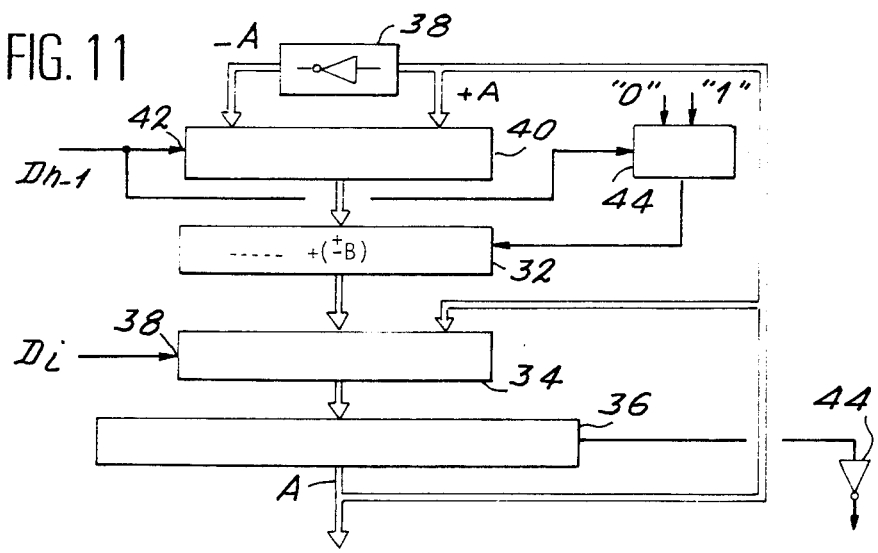
FIG. 11 A constructional variant of the multiplier of FIG. 10 incorporating a parallel output register.

The accumulator-shift register 36 is adequate when no pipeline is envisaged. Register 36 is advantageously of the type permitting either a parallel output, or a serial output. In the latter case, it is advantageous to include an inverter 44 on the serial output, as shown in FIG. 11, so as to obtain in the case where the serial operand is negative, the final complement of the content of register 36. This makes it possible to save one clock cycle compared with a final complementation of the content of register 36 via inverter 38 and multiplexer 40.

Figure 12:
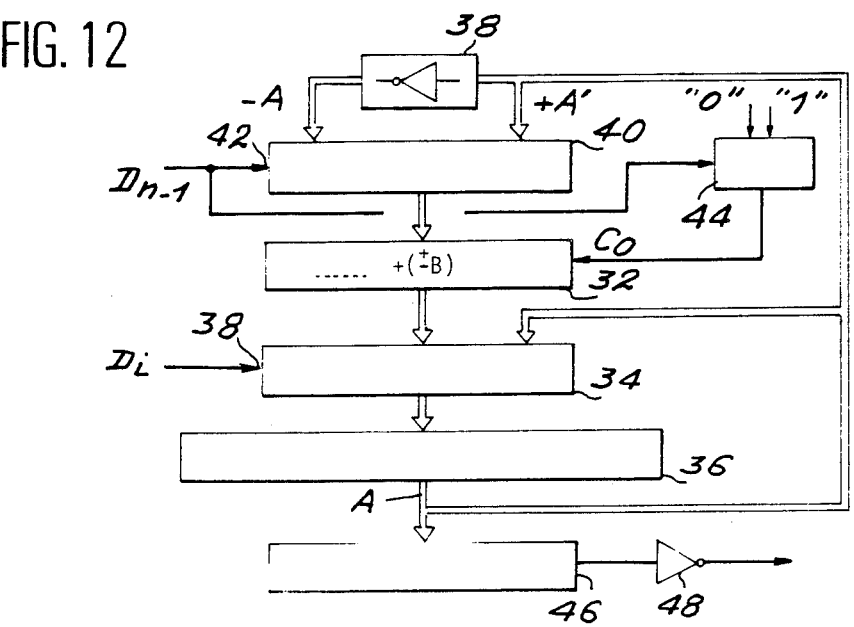
FIG. 12 A constructional variant of the multiplexer of FIG. 10 incorporating a parallel-serial output register.

In the case where several multiplications must be performed in cascade, it is desirable to provide pipeline possibilities between successive multipliers. In this case two registers must be used, namely a first register acting as an accumulator and a second register which performs the parallel-serial format conversion. Such a multiplier is shown in FIG. 12. Register 36 serves as an accumulator for the partial multiplication results. At the end of multiplication, the content of register 36 is recorded in parallel in a parallel-seri register 46. An inverter 48, having a function identical to the inverter of the multiplier of FIG. 11, can be located on the serial output of register 46.

The simultaneous use of two registers 36 and 46 makes it possible to start a second multiplication in the multiplier whilst the result of the first multiplication is undergoing parallel-serial format conversion in register 46.

In the multiplier shown in FIG. 9 and in its constructional variant shown in FIGS. 10 to 12, each bit $D_i$ of the serial operand D is individually processed. The number of additions required for performing the multiplication is consequently equal to the number of bits of the fixed operand D.

In the field of binary multipliers, an algorithm, called the Booth algorithm is known, which makes it possible to group several partial sums so as to obtain the result of the multiplication in less additions than the non-fixed operand D has bits. For example, with the three bit Booth algorithm, the bits of the non-fixed operand D are processed three by three with a shift of two bits for each clock period, which makes it possible to obtain the result of the multiplication in n/2 additions.

In the 3 bit Booth algorithm, three consecutive bits $D_{i-1}$, $D_i$ and $D_{i+1}$ of operand D are combined to produce a decoding value d in accordance with the following table I.

TABLE I

| $A_{i+1}$ | $A_i$ | $A_{i-1}$ | $d = -2.A_{i+1} + A_i + A_{i-1}$ |
|---|---|---|---|
| 0 | 0 | 0 | 0 |
| 0 | 0 | 1 | +1 |
| 0 | 1 | 0 | +1 |
| 0 | 1 | 1 | +2 |
| 1 | 0 | 0 | −2 |
| 1 | 0 | 1 | −1 |
| 1 | 1 | 0 | −1 |
| 1 | 1 | 1 | 0 |

This value d defines a multiplicative coefficient for operand D before it is added to fixed operand B.

The values given in table I show that it is necessary to be able to add to the fixed operand B one of the values 0, D, 2D, −D and −2D, for which purpose the multiplier must be modified so that it can: shift register 36 by 1 and 2 bits, so that values D and 2D are produced, control multiplexer 40 to complement the content of the register and thus produce the values −D and −2D, store the polarity of the result stored in register 36.

Figure 13:
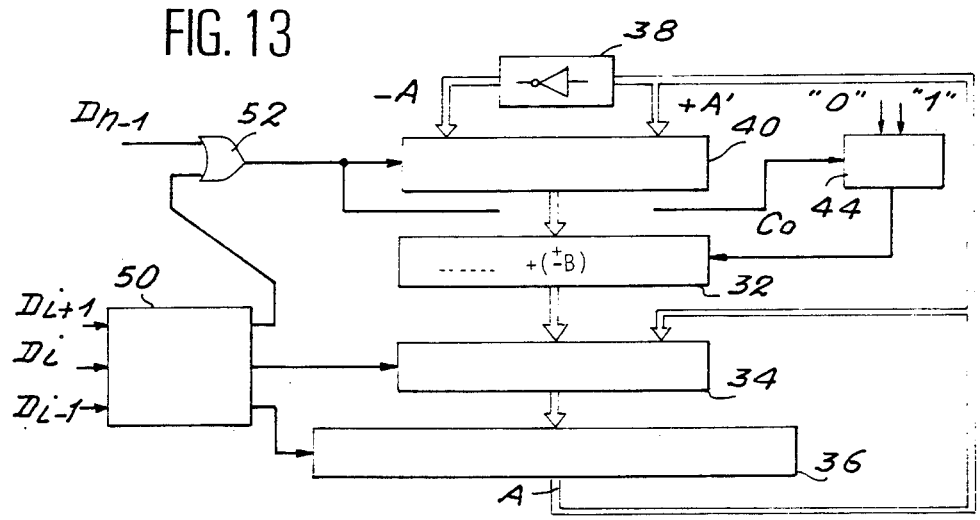
FIG. 13 An embodiment of the multiplier according to the invention permitting the implementation of the Booth algorithm.

A multiplier according to the invention implementing the 3 bit Booth algorithm is shown diagrammatically in FIG. 13. This multiplier comprises the same elements as that shown in FIG. 10. It also comprises a Booth decoder 50 having three inputs to which are simultaneously applied three consecutive bits $D_{i-1}$, $D_i$ and $D_{i+1}$ of the variable operand D.

The multiplier also comprises an OR gate 52, whereof one input receives the most significant bit $D_{n-1}$ from operand D and whereof the other input is connected to an output of decoder 50, the output of the OR gate 52 being connected to the control input 42 of multiplexer 40.

Decoder 50 comprises a register for storing a status bit, in order to store the polarity of the content of register 36. It also comprises a means for calculating the value d indicated in table I as a function of the bits received and for supplying, as a function of said value and the stored status bit, control signals to register 36, multiplexer 34 and OR gate 52.

TABLE II

| Type of multiplier | tr | T | F = tr × T |
|---|---|---|---|
| Reading a table into a ROM | $3.N.2^N$ | 1 | $3.N.2^N$ |
| Standard multiplier (FIG. 3) | 48.N | N | $48.N^2$ |
| Standard multiplier (FIG. 3) + 3 bit Booth decoder | 50.N | N/2 | $25.N^2$ |
| Following multiplier (FIG. 10) | 24.N | N | $24.N^2$ |
| Following multiplier (FIG. 13) (3 bit Booth decoder) | 26.N | N/2 | $13.N^2$ |

Table II illustrates the relative performances of the multiplier according to the invention and the known multipliers using either a standard multiplier able to multiply two random operands, or a reading into a table in a ROM.

The performances are expressed by the merit factor F equal to the product of the silicon surface, proportional to the number of transistors tr required for producing the multiplier, by the number T of clock cycles necessary for carrying out the multiplication. Parameters tr and T are expressed as a function of the number of bits N of each operand.

The multiplier of FIG. 10 according to the invention has a merit factor slightly higher than a conventional multiplier incorporating a Booth decoder. The merit factor is also doubled if the multiplier according to FIG. 10 is provided with a Booth decoder.

What is claimed is:

1. A binary adder for adding a first operand A of n bits $A_{n-1}, \ldots A_0$ having a random binary value to a second operand B of n bits $B_{n-1}, \ldots B_0$ of predetermined binary value, said adder comprising:

n addition cells $CA_{n-1}, \ldots CA_0$, each cell being provided with a data input for receiving a bit $A_i$, $0 \leq i \leq n-1$ from the first operand, a carry input for receiving a carry bit $C_i$, a data output $S_i$ and a carry output for supplying a carry bit $C_{i+1}$, the carry output of the addition cell of rank j, $0 \leq j \leq n-2$ being connected to the carry input of the addition cell of rank j+1, wherein each addition cell $CA_i$, $0 \leq i \leq n-1$ is wired as a function of the value of bit $B_i$ of the operand B;

wherein each addition cell associated with a bit $B_i$ of logic value "1" of the fixed operand B comprises an OR gate receiving bits $A_i$ and $C_i$ and supplying the carry bit $C_{i+1}$;

and an inverter receiving bit $A_i$ and a XOR gate receiving bit $C_i$ and the bit supplied by the inverter and supplying the sum bit $S_i$.

2. A binary adder for adding a first operand A on n bits $A_{n-1}, \ldots A_0$ having a random binary value to a second operand B of n bits $B_{n-1}, \ldots B_0$ of predetermined binary value, said adder comprising:

n addition cells $CA_{n-1}, \ldots CA_0$, each cell being provided with a data input for receiving a bit $A_i$, $0 \leq i \leq n-1$ from the first operand, a carry input for receiving a carry bit $C_i$, a data output $S_i$ and a carry output for supplying a carry bit $C_{i+1}$, the carry output of the addition cell of rank j, $0 \leq j \leq n-2$ being connected to the carry input of the addition cell of rank j+1, wherein each addition cell $CA_i$, $0 \leq i \leq n-1$ is wired as a function of the value of bit $B_i$ of the operand B;

wherein said adder's addition cells are of at least two of the four following types:

an addition cell associated with a bit $B_i$ of logic value "0" and whose structure is designed to receive a carry bit $\underline{C_i}$ and for supplying a complemented carry bit $\overline{C_{i-1}}$;

an addition cell associated with a bit $B_i$ of logic value "1" and whose structure is designed to receive a carry bit $\underline{C_i}$ and for supplying a complemented carry bit $\overline{C_{i+1}}$;

an addition cell associated with a bit $B_i$ of logic value "0" and whose structure is designed to receive a complemented carry bit $\overline{C_i}$ and for supplying a carry bit $C_{i+1}$; and an addition cell associated with a bit $B_i$ of logic value "1" and whose structure is designed to receive a complement carry bit $\overline{C_i}$ and for supplying a carry bit $C_{i+1}$, the addition cells of the adder being chosen in accordance with the binary value of the fixed operand B and so as to respect the polarity of the carry bit transmitted between two consecutive cells.

3. A parallel-serial binary multiplier for the multiplication of a fixed operand B by n bits $B_{n-1}, B_{n-2}, \ldots B_0$ by an operand D of n bits $D_{n-1}, D_{n-2}, \ldots D_0$ of random value, wherein the multiplier comprises:

an accumulator and shift register for storing a partial multiplication result, said register having an input and an output, an adder with n addition cells $CA_{n-1}, \ldots CA_0$, each cell being provided with a data input for receiving a bit $D_i$, $0 \leq i \leq n-1$, from the first operand, a carry input for receiving a carry bit $C_i$, a data output $S_i$ and a carry output for supplying a carry bit $C_{i+1}$, the carry output of the addition cell of rank j, $0 \leq j \leq n-2$ being connected to the carry input of the addition cell of rank j+1, each addition cell $CA_i$, $0 \leq i \leq n-1$ being wired as a function of the value of the bit $B_i$ of operand B, said adder having an input connected to the output of the register and an output and a first multiplexer having two inputs respectively connected to the output of the adder and to the output of the register and an output of the register and an output connected to the input of the register, said multiplexer also having a control input to which is applied the no-fixed operand D in serial form;

wherein each addition cell of said adder, associated with a bit $B_i$ of logic value "0" of fixed operand B, comprises an AND gate and a XOR gate, each receiving on its inputs bits $D_i$ and $C_i$, the AND gate supplying the carry bit $C_{i+1}$ and the XOR gate the sum bit $S_i$.

4. A binary multiplier according to claim 3, wherein each addition cell of said adder, associated with a bit $B_i$ of logic value "1" of the fixed operand B, comprises an OR gate receiving bits $D_i$ and $C_i$ and supplying the carry bit $C_{i+1}$, an inverter receiving bit $D_i$ and a XOR gate receiving bit $C_i$ and the bit supplied by the inverter and supplying the sum bit $S_i$.

5. A binary multiplier according to claim 3, wherein the said adder comprises addition cells according to at least two of the four following types:

an addition cell associated with a bit $B_i$ of logic value "0" and whose structure is designed to receive a carry bit $\underline{C_i}$ and for supplying a complemented carry bit $\overline{C_{i+1}}$;

an addition cell associated with a bit $B_i$ of logic value "1" and whose structure is designed to receive a carry bit $\underline{C_i}$ and for supplying a complemented carry bit $\overline{C_{i+1}}$;

an addition cell associated with a bit $B_i$ of logic value "0" and whose structure is designed to receive a complemented carry bit $\overline{C_i}$ and for supplying a carry bit $C_{i+1}$; and and addition cell associated with a bit $B_i$ of logic value "1" and whose structure is designed to receive a complemented carry bit $\overline{C_i}$ and for supplying a carry bit $C_{i+1}$, the addition cells of the adder being chosen in accordance with the binary value of the fixed operand B and so as to respect the polarity of the carry bit transmitted between two consecutive cells.

6. A multiplier according to claim 3 for permitting the multiplication of two operands B and D of opposite signs, wherein the multiplier also comprises: a second multiplexer located between the output of the accumulator-shift register and the input of the adder, said second multiplexer having two inputs respectively connected to the output of the register and to the output of an inverter, whose input is connected to the output of the register; and a third multiplexer having two inputs respectively maintained in logic states "0" and "1" and whose output is connected to a carry input $C_0$ of the adder, said second and third multiplexers being controlled by the most significant bit $D_{n-1}$ of operand D.

7. A multiplier according to claim 6, wherein it comprises a Booth decoder, said decoder receiving the bits from operand D in groups of 3 consecutive bits, said decoder producing signals for controlling, as a function of the logic value of said bits, the first and second multiplexers and the register, said decoder having a storage means for a status bit for storing the polarity of the content of the register.

* * * * *